April 15, 1941. W. M. VENNER ET AL 2,238,085
PISTON
Filed Jan. 7, 1939 2 Sheets-Sheet 1
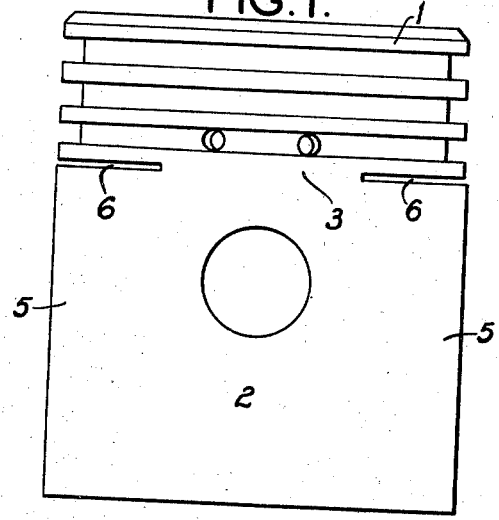
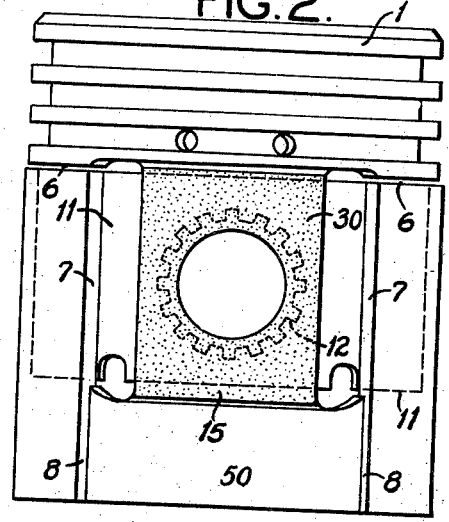
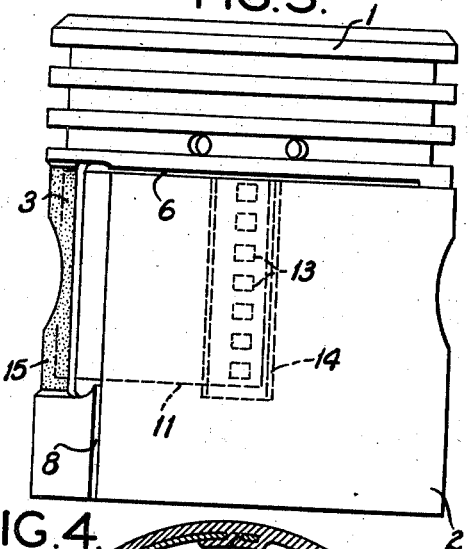
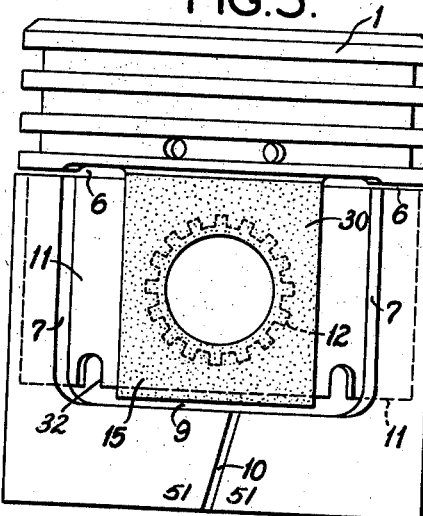
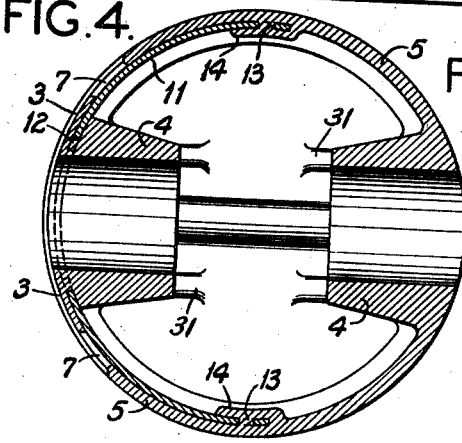
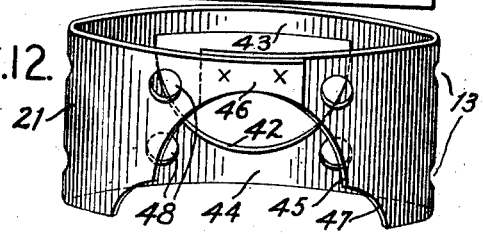
INVENTORS;
WILLIAM M. VENNER
PERCY L. BOWSER JR.
BY Brunniga & Sutherland
THEIR ATTORNEYS April 15, 1941.   W. M. VENNER ET AL   2,238,085
PISTON
Filed Jan. 7, 1939   2 Sheets-Sheet 2

INVENTORS;
WILLIAM M. VENNER
PERCY L. BOWSER JR.
BY
THEIR ATTORNEYS

Patented Apr. 15, 1941

2,238,085

UNITED STATES PATENT OFFICE 2,238,085

PISTON

William M. Venner, Richmond Heights, and Percy L. Bowser, Jr., University City, Mo., assignors to The Sterling Corporation, St. Louis, Mo., a corporation of Delaware Application January 7, 1939, Serial No. 249,688

13 Claims. (Cl. 309—13)

This invention pertains to pistons and more particularly to trunk type pistons such as are used in internal combustion engines. The invention is applicable particularly to light metal pistons such as are cast of aluminum or magnesium alloys.

This application is a continuation of application Ser. No. 208,185, filed May 6, 1938, as to the subject matter common to both.

One of the objects of this invention is to provide a piston of light metal type having novel means for compensating for the thermal expansion of the piston during the operation thereof.

Another object is to provide such a piston with a control element of less expansible material than the piston metal so arranged that a thermostatic deformation of the piston takes place tending to compensate for the expansion of the piston metal.

Another object is to provide a piston with such less expansible means for controlling expansion in such a manner as to retain a substantially circular cross section for the cylinder bearing portions of the piston.

Further objects will appear from the following description taken in connection with the accompanying drawings in which Figure 1 is a side view looking along the wrist-pin axis of a piston embodying this invention.

Figure 2 is a similar view looking in the opposite direction.

Figure 3 is a side view looking transversely of the wrist-pin axis.

Figure 4 is a transverse section taken through the wrist-pin axis.

Figure 5 is a view similar to Figure 2, illustrating another embodiment of the invention.

Figure 12 is a perspective detail of a band.

Figure 6:
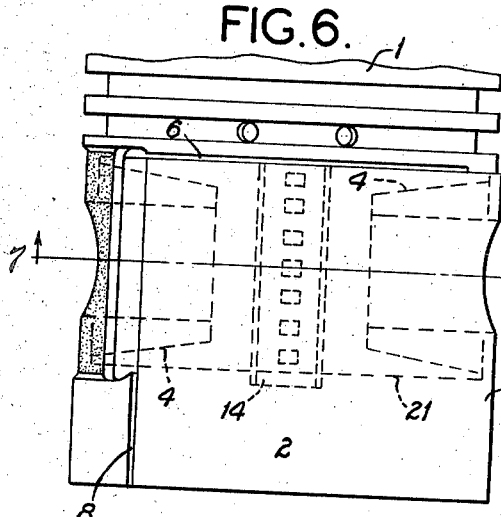
Figure 6 is a side view of a piston illustrating another embodiment of this invention.

Referring to the drawings, the invention applies to a trunk piston of a light-weight material such as aluminum having a head 1 and a skirt 2. Extending downwardly from the head 1 are piers or connectors 3 and 30 on which are formed wrist-pin bosses 4. The piers 3 and 30 may be stiffened by internal ribs 31 or other suitable means to connect them with the head in a rigid structure.

The skirt 2 has cylinder bearing sections 5 in the regions between the connectors 3 and 30 and these sections are separated from head 1 by horizontal slots 6.

One of the piers or connectors 30 is so formed as to be separate from the adjacent bearing sections 5 by providing gaps 7 between said pier and said sections. This pier may be separated from the rest of the skirt by vertical slots 8, as shown in Figure 2 thus providing a rim portion 50 at the end of the pier 30, or by a horizontal slot 9, as shown in Figure 5. The lower rim portion 51 of the skirt below the slot 9 may be circumferentially complete or it may be slotted, as indicated at 10, to render this portion of the skirt more flexible.

In order to control the expansion of the skirt, a control element in the form of a flexible band 11 of a material such as steel, which is less expansible than the piston material such as aluminum, is cast into the piston structure. This band may have a semi-circular form, as shown in Figure 4, extending from about the mid-portion of one of the bearing sections 5, through the outer portion of the separate pier or connector 3 to about the mid-portion of the opposite bearing section 5. This band is shown in dotted lines in Figures 2 and 5 and is provided with an opening indicated at 12, which may have an irregular outline so as to form a secure interlock with the boss 4, in which it is cast. The band 11 may be positioned in the mold and the piston cast around it so as firmly to secure the band to the piston structure. Where the ends of the band are imbedded in the bearing sections 5, the band may be provided with openings, indicated at 13, so as to permit the piston metal to penetrate the openings and form a secure interlock. The ends of the band may be imbedded in vertically extending ribs 14, formed on the interior of the sections 5 for that purpose. The band 11 is positioned interiorly of the skirt and bridges the gaps 7.

In making this piston, the band 11 is suitably positioned in the mold as by means of stops in the mold-engaging notches 32 in the band and the casting metal poured in. The skirt is usually cast solid with the head and thereafter the slots 6 are formed by making a saw-cut on each side, as shown. When the piston cools after casting, the skirt usually sets first, so that the head is hotter than the skirt at the time the latter sets. Upon further cooling, the head tends to contract more than the skirt and thereby an inwardly directed force is exerted upon the skirt by the subsequent cooling of the head. When the slots 6 are cut this force is relieved and the bearing sections 5 tend to spring outwardly, and thereby a slight clearance may be formed between this portion of the skirt and the band 11 at those portions which are not positively imbedded in the skirt metal.

The skirt of this piston may be machined to an exact circular form instead of providing the usual oval cross section. In some cases, however, it is preferable to relieve the portion of the separate pier 30 around the end of the wrist pin, as indicated at 15. When this piston expands on a rise of temperature, the piers 3 and 30 expand with the head. This expansion tends to stretch the band 11 toward the left of Figure 4, so as to place the same under tension, which is transmitted to the skirt at the ribs 14. As the skirt is free to contract its circumference by virtue of the slots 6 and 8 or 9 and the gaps 7, this action tends to shrink the circumference of the skirt and an adjustment may readily be made, so that the tendency to shrink or contract compensates for the tendency of the skirt to increase its diameter under thermal expansion. It will also be noted that the free edges of the skirt along the gaps 7, are free to flex and may even have a slight clearance over the band 11, so that pressure of the cylinder wall at these portions may be relieved by flexure of the skirt. The band 11 may be made the full height of the wrist pin boss, as shown in Figures 2 and 5, or it may be narrower. An effective construction is to provide a narrow band connecting the upper portions of the bearing faces 5 to the bosses 4 and passing above the wrist pin opening.

Figure 7:
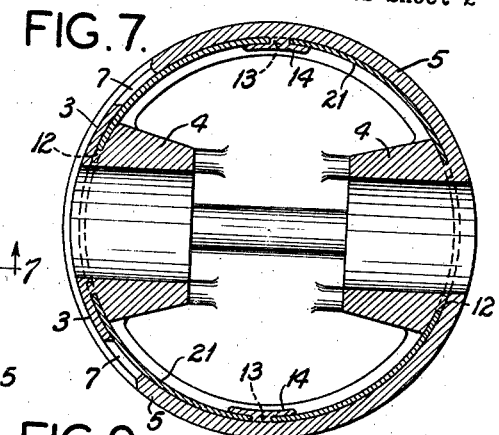
Figure 7 is a section on line 7—7 of Figure 6.

In the embodiment of Figures 6 and 7, the band 21, corresponding to the band 11 of the previous figures, is in the form of a complete hoop extending entirely around the piston skirt. This band is imbedded in the wrist pin bosses 4 in the same manner as already described, and is connected to the middle portion of the cylinder bearing sections 5 of the skirt by means of the ribs 14 as already described. This construction not only strengthens the band 21 forming the expansion control element so that the same is capable of giving a better support to the skirt sections, but it improves the expansion control provided by that element. The strengthening of the structure by the complete circular band will be clear from the fact that it is a complete ring, and that it is imbedded firmly at both ends of a diameter in the wrist pin bosses. The improved expansion control is probably due at least partly to a thermostatic action taking place by virtue of the bi-metallic arrangement of the band 21 and the skirt section 5.

Figure 9:
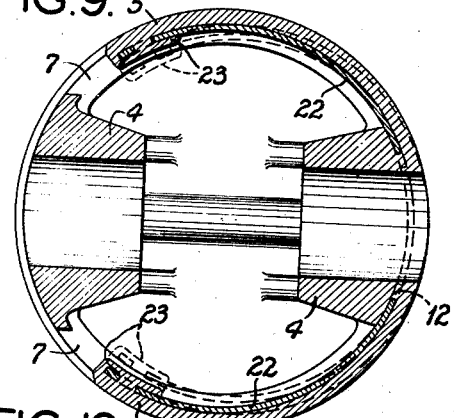
Figure 9 is a sectional view similar to Figure 7 illustrating the thermostatic action of the piston under increasing of temperature.

Figure 9 shows a form of structure somewhat modified from that of Figure 7, but which it is believed undergoes a thermostatic action which is also active in the structure of Figure 7. In the structure of Figure 9, the band is indicated at 22 in solid lines in its position when the piston is at ordinary temperatures. In this embodiment the band is not wholly circular but extends around a little more than half of the piston circumference. Furthermore, its middle portion is imbedded in the pin boss 4 which is connected with the skirt sections 5, said sections being separated from the opposite pin boss by the gaps 7. In this embodiment the band 22 extending around the skirt in both directions from the pin boss 4, to which the sections 5 are connected, terminates adjacent the ends of those sections at the gaps 7. At these end points the band is connected to the sections 5 by means of ribs 23 similar in all respects to the ribs 14. Thus the bearing sections of the skirt are constructed in effect as bi-metallic elements having an outer portion of aluminum or other piston metal, and an inner portion formed by the steel band 22. These elements are connected together at the ribs 23 and also at the pin boss 4, but are free to shift relatively to one another at intermediate points.

When this piston is heated up, the outer skirt section 5 of aluminum will expand to a greater extent than the inner band 22. Accordingly by the well known bi-metallic effect the greater lengthening of the outer arc of the skirt section as compared to the inner portion formed by the band 22 will cause said section to curl inwardly, as indicated to a greatly exaggerated extent in dotted lines in Figure 9. This effect is very pronounced. It has been found in fact that a reduction of the bearing diameter of a skirt of this construction of over .030 inch on a three-inch piston is obtained with only about 200 degrees Fahrenheit rise of temperature.

As this thermostatic action of the structure of Figure 9 may produce a greater controlling effect than is necessary, the structure of Figure 7 tends to control and limit the thermostatic action on account of the fact that the band is a complete ring instead of having its ends free.

Figure 10:
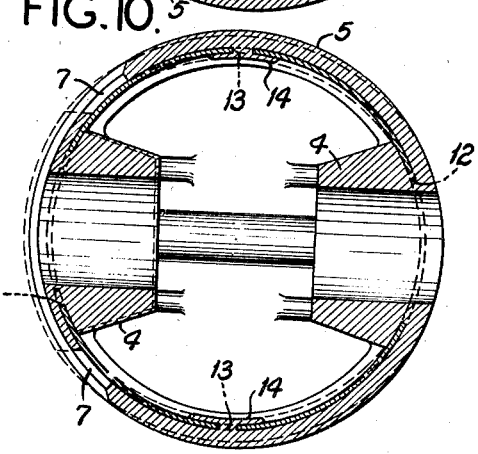
Figure 10 is a similar sectional view illustrating a theory of expansion of a piston shown in Figure 7.

The expansion control of the structure of Figure 7 may be explained by reference to Figure 10. In this figure the expansion of the piston is shown as if the right-hand end of the wrist pin diameter were held stationary during expansion, so that the piston expands toward the left from that point, this being permitted by virtue of the relief 15 on that side of the piston. Accordingly, the movement of the left hand pin boss 4 under temperature rise is indicated in dotted lines in Figure 10. Such movement tends to stretch the hoop of the band 21 along the wrist pin axis, so as to contract its transverse diameter. The change of shape is indicated in dotted lines in Figure 10. It should be noted, however, that in this structure also that portion of the bearing section between the rib 14 and the right hand pin boss 4 also constitutes a bimetallic thermostatic element which tends to curl inwardly upon expansion as described for Figure 9. This tendency assists the action of the pin bosses in stretching the band 21 and in tending to reduce the transverse diameter of the piston, namely: the vertical diameter in Figure 10. The cooperation of these two effects is such as to afford greater control over the cylinder-bearing sections since greater forces may be brought into play, and the stiffness of the aluminum portions of the sections 5 is more readily overcome. By a proper adjustment of the relations of the parts therefore, an almost exact compensation for the tendency of the skirt to expand with rise of temperature may be accomplished.

In this embodiment also, the skirt may be formed truly round or circular in cross section instead of oval as is the usual practice, and the control of expansion is so applied that the circular shape is substantially retained throughout the working range of temperature. It has been found that to maintain a circular form for the skirt has a great advantage in reducing the tendency of the piston to rock in the cylinder, since the bearing against the cylinder wall is substantially uniform throughout a considerable arc of the skirt surface, while in the case of an oval ground piston only a line bearing is obtained.

Figure 8:
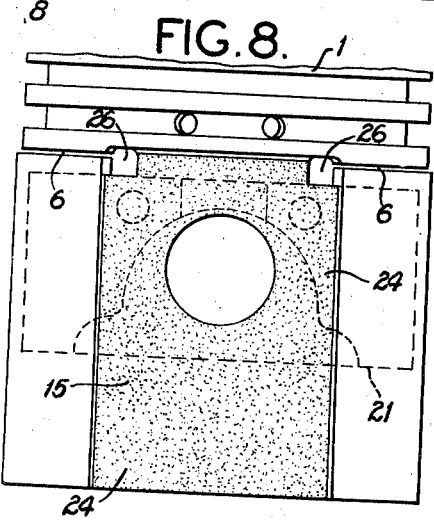
Figure 8 is a side view taken along the wrist-pin axis of another piston embodying this invention.

In certain types of internal combustion engines, it has been found that the cooling devices of certain cylinders are insufficient to prevent hot spots in the cylinder walls. A piston operating in such a cylinder, if the hot spot should be located at a point where it is in contact with the piston opposite the wrist pin axis at that end where the skirt sections are connected to the pin boss, as for instance, in the region in the middle of Figure 1, the excessive temperature may warp the cylinder wall to such an extent as to cause an excessive bearing pressure at this point. Under such circumstances, it is advantageous to relieve the piston skirt opposite either end of the pin axis, as indicated at 24 in Figure 8, or the skirt may be given an elliptical cross-section with its minor axis along the pin axis, in a manner well known in the art. This may apply, under proper circumstances, to the half-band structure of Figures 1 to 5 as well as to the full-band structure of Figures 6 to 12.

Figure 11:
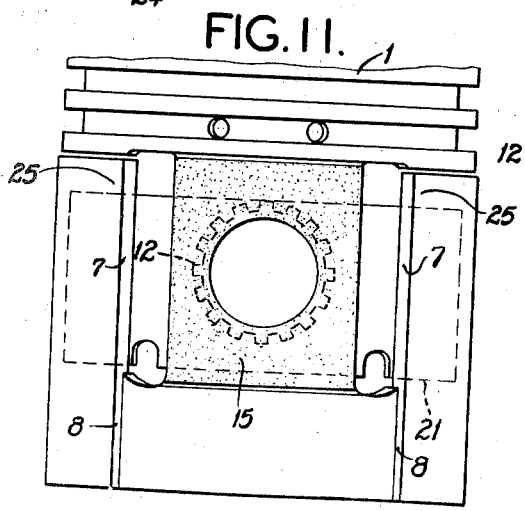
Figure 11 is a side view similar to Figure 2 illustrating another embodiment of the invention.

It has also been found advantageous, under certain circumstances, to control the expansion of the band 11 or 21 by controlling the amount of heat which it receives from the piston. Since the piston head is the hottest portion of the piston, a considerable amount of heat may be radiated from the head to the band, if the latter is placed in close proximity to the head. In such a case the band may be made to operate at a somewhat lower temperature by spacing the same from the head downwardly along the piston, as shown in Figure 11. In this figure the band 21 has been moved downwardly so as to space its upper edge from the piston head. This has the additional effect of providing an upwardly extending free portion of the skirt, indicated at 25, and which extension is rendered somewhat flexible so that it may yield to pressure of the cylinder wall. Figure 11 shows this effect on that side of the piston on which the gaps 7 are located. A similar effect may be provided at the opposite side of the skirt by providing notches or openings 26 at the sides of the connectors joining the pin bosses to the head. Such an opening may be carried downwardly to any extent desired by forming a notch in the upper edge of the band 21.

The nature and extent of the control exercised by the band 21 may be varied and adjusted to a certain extent by varying the mechanical arrangement of the band in its relation to the connectors and the bearing sections of the skirt, as well as its spacing from the head. It has been found, for instance, that a better control is obtained under certain circumstances when the band is so arranged as to support stress put upon it by the original contraction of the piston metal when the casting is made. It will be noted, for instance, that in Figures 4 and 7 certain portions of the band extend circumferentially within the skirt portion 5, and are arranged to abut the connectors (at the openings 12) in such a manner that when the piston metal undergoes its original contraction immediately after the metal solidifies in casting, the shrinkage of the portion 5 puts the band under compression. This, of course, is due to the fact that the rate of contraction is greater for the aluminum than for the steel. Thus an initial condition of stress is established between the different metals, such stress being of considerable magnitude in some cases, and subsequent variations in temperature due to operating conditions produce variations in such stress which will be effective in causing the deformations described. Accordingly, it is advantageous to have the band so arranged as to provide this abutment at the connectors for that portion which extends inside of the skirt.

Another feature affecting the nature and extent of the control obtainable is the relative expansibility of the two materials. The piston metal is usually determined as to composition by casting conditions. Accordingly, the rate of expansion will usually be fixed. The steel, however, may have its composition varied so as to adjust its rate of expansion. This can even be reduced practically to zero by the use of invar steel.

An important feature of the mechanical arrangement is the manner in which the forces are applied to the piston structure. When the band is placed close to the upper end of the bearing sections of the skirt, the expansion of that portion of the skirt will follow closely the expansion of the band. Accordingly, where there is a great difference between the expansibility of the band and that of the piston material, the growth of the piston diameter at the top of the skirt would be comparatively small. At the same time it must be remembered that when the band is placed close to the top of the skirt, it is nearer to the source of heat and, therefore, usually operates at a higher temperature, so that its full action in holding down the growth of the skirt diameter is modified according to its temperature. This again is controlled by the material of which the band is made, that is, whether of ordinary steel or of such low-expansion material as invar. On the other hand, if the band is placed close to the lower end of the skirt, or, as is often done, along the lower ends of the connectors just above the slot 9, the effect in controlling the growth of the upper end of the skirt is less, while the control of the lower end is greater. Here again the positioning of the band affects its temperature during operation and modifies its control effect accordingly.

In positioning a band above or below the wrist pin opening as just described, a relatively narrow band would ordinarily be used. It is advantageous, however, to use a comparatively broad band such as shown in the drawings. One advantage of this is that a more secure attachment of the band to the connectors 3 and to the skirt may be obtained in a broad band than in a narrow one. Furthermore, the band acts in supporting the skirt mechanically with respect to the head, and for this reason a broad band having more material more advantageously disposed to withstand the forces involved, adds greatly to the strength of the piston. In accordance with this invention a number of the above advantages is secured by employing a band of the form illustrated in Figure 12. This is a relatively broad band, so that the advantages of strength are secured. At the same time, the control of expansion at the top and bottom of the skirt may be adjusted to advantage. In Figure 12 the band is indicated generally at 21. This is provided at one end of the wrist pin axis with a wrist pin opening 42. This opening is of oval form, placed so as to extend laterally with respect to the piston. It is somewhat larger than the wrist pin opening in the piston, so that the piston material will flow through the opening 42 during the casting operation, forming bridges passing through the band, thereby strengthening the connectors 3. This leaves a strip 43 passing above the wrist pin opening and a similar strip 44 passing below said opening, so that the control exercised by the band is effective at both the upper and lower portions of the skirt. At the opposite end of the wrist pin axis, the band 21 is provided with a second wrist pin opening 45. This opening is extended laterally in a generally oval form, similar to that of the opening 42. However, in this case the lower portion of the band is entirely cut away. This, therefore, provides a strip 46 similar to the strip 43 passing above the wrist pin opening, while at this end of the wrist pin axis there is no such strip passing below said opening. It has even been found of advantage in some cases to extend the opening somewhat at the lower edge of the band as indicated at 47. Additional perforations 48 may be provided to permit the casting metal to flow through the band to strengthen the connectors 3. Perforations 13 may be provided to interlock with the ribs 14, as already described.

It has been found that this form of band provides a very accurate control of the expansion of the skirt as a whole. At the upper portion the strips 43 and 46 provide a continuous band at the point where the skirt is at the highest temperature, so that full control of the band is effective to hold down the expansion to a desired value. At the lower portions of the skirt, however, the band is not continuous around the entire piston, but has a gap 45—47. This limits somewhat the controlling effect of the band upon the piston at this point. It should be noted that the temperature of the piston skirt is lower in the region adjacent to the lower rim of the band 21, and therefore less restraint of expansion is necessary. The band, however, is also at a lower temperature in this region. Accordingly, by reducing its extent by means of the gap 45—47, its controlling effect is reduced to an amount comparative with that of the band at the upper part of the skirt. It has been found that this arrangement is capable of maintaining a diameter of the bearing faces of the skirt practically the same at the top and bottom throughout the range of working temperatures, and, at the same time, hold this expansion down to within as low as 0.001 to 0.002 of an inch. Such a band may be constructed out of ordinary sheet metal, and after forming to the hoop shape shown, the overlapping ends forming the strip 46 may be secured together in any suitable way as, for instance, by spot welding.

It will be seen, therefore, that this invention provides a piston which may be formed with a circular cross section, so as to have full bearing on the cylinder wall throughout all of its bearing surfaces. At the same time full compensation for expansion may be provided. Such compensation may be affected by the action of the expanding pin bosses tending to stretch the band along the pin axis and thereby contracting the skirt along the transverse axis. It may also be affected or assisted by the thermostatic action explained in connection with Figure 9. The fact that one of the pin bosses is separate entirely from the bearing sections of the skirt permits the expansion of the head which is impressed upon the pin bosses to be taken care of by allowing an ample reduction of diameter for the head and the pin boss axis, and at the same time this excessive expansion is not communicated to the rest of the skirt. The expansion movement is, however, made use of through the agency of a control element of less expansible material from that of the piston skirt and head to introduce just that extent of control which is necessary to compensate for the tendency of the bearing sections to expand. It has been found in practice that a piston constructed in accordance with this invention can be made to maintain a clearance in the cylinder of substantially .001 of an inch throughout the ordinary working range of temperature in an internal combustion engine.

While a certain theory of action has been announced in describing this piston, it will be understood that this is for the purpose of explanation, and that the invention does not depend upon any particular theory of action. It is also clear that certain individual features or sub-combinations of the structure may be used by themselves without reference to other features or to the complete combination, and that the employment of such individual features or sub-combinations is contemplated by this invention when within the scope of the appended claims.

It is further obvious that various changes in the details of construction can be made within the scope of the appended claims without departing from the spirit of this invention. It is understood, therefore, that the invention is not limited to the specific details shown and described.

Having thus described the invention, what is claimed is:

1. A piston, comprising, a head, a skirt, wrist pin bosses, connectors integrally connecting said head with said bosses, said skirt having cylinder-bearing sections in the regions between said bosses, said sections being separated from said head, one of said connectors being integrally connected with said sections and the other being separate from said sections, and a control element of less expansible material than said skirt connected to said sections and one of said connectors to control the expansion of said sections.

2. A piston, comprising, a head, a skirt, wrist-pin bosses, connectors integrally connecting said head with said bosses, said skirt having cylinder-bearing sections in the regions between said bosses, said sections being separated from said head, one of said connectors being integrally connected with said sections and the other being separate from said sections, and a control element of less expansible material than said skirt connected to said sections and both of said connectors to control the expansion of said sections.

3. A piston, comprising, a head, a skirt, wrist-pin bosses, connectors integrally connecting said head with said bosses, said skirt having cylinder-bearing sections in the regions between said bosses, said sections being separated from said head, one of said connectors being integrally connected with said sections and the other being separate from said sections, and a control element of less expansible material than said skirt connecting said separate connector with said skirt, said cylinder-bearing sections being formed to a substantially circular cross section but said skirt being relieved between said sections.

4. A piston, comprising, a head, a skirt, wrist-pin bosses, connectors integrally connecting said head with said bosses, said skirt having cylinder-bearing sections in the regions between said bosses, said sections being separated from said head, one of said connectors being integrally connected with said sections and the other being separate from said sections, and a control element of less expansible material than said skirt connecting said separate connector with said skirt but spaced from said head.

5. A piston, comprising, a head, a skirt, wrist-pin bosses, connectors integrally connecting said head with said bosses, said skirt having cylinder-bearing sections in the regions between said bosses, said sections being separated from said head, one of said connectors being integrally connected with said sections and the other being separate from said sections, and a hoop-shaped control element of less expansible material than said skirt extending circumferentially therewithin and connected to said cylinder-bearing sections to form therewith a bimetallic barrel-shaped portion arranged to cause, by virtue of its dual expansion, thermostatic deformation of said skirt such as to limit the expansion of said sections.

6. A piston, comprising, a head, a skirt, wrist-pin bosses, connectors integrally connecting said head with said bosses, said skirt having cylinder-bearing sections in the regions between said bosses, said sections being separated from said head, one of said connectors being integrally connected with said sections and the other being separate from said sections, and a hoop-shaped control element of less expansible material than said skirt extending circumferentially therewithin and connected thereto and to one of said connectors so as to control the expansion of said sections.

7. A piston, comprising, a head, a skirt, wrist-pin bosses, connectors integrally connecting said head with said bosses, said skirt having cylinder-bearing sections in the regions between said bosses, said sections being separated from said head, one of said connectors being integrally connected with said sections and the other being separate from said sections, and a hoop-shaped control element of less expansible material than said skirt extending circumferentially therewithin and connected to said cylinder-bearing sections and to one of said connectors so as to control the expansion of said sections, said control element being spaced downwardly from said head.

8. In a piston of the character described, having a head, a skirt, wrist-pin bosses, and connectors integrally connecting said head with said bosses, said skirt having cylinder-bearing sections in the regions between said bosses separated from said head; a control element of less expansible material than said skirt extending therewithin between and embedded in one of said connectors, the embedded portion thereof having a wrist-pin opening of laterally-extending oval form, the piston metal passing through said opening to reinforce said connector.

9. In a piston of the character described, having a head, a skirt, wrist-pin bosses, and connectors integrally connecting said head with said bosses, said skirt having cylinder-bearing sections in the regions between said bosses separated from said head; a hoop-shaped control element of less expansible material than said skirt extending circumferentially therewithin and having a portion embedded in one of said connectors, said portion extending above and downwardly along the sides of the wrist-pin opening in said connector and flaring laterally at its bottom.

10. In a piston of the character described, having a head, a skirt, wrist-pin bosses, and connectors integrally connecting said head with said bosses, said skirt having cylinder-bearing sections in the regions between said bosses separated from said head; a hoop-shaped control element of less expansible material than said skirt connected to said cylinder-bearing sections and extending circumferentially therewithin and having a portion embedded in each of said connectors, one of said portions extending above and below the wrist-pin opening in its connector and the other extending above but not below its respective wrist-pin opening.

11. A piston, comprising, a head, wrist pin bosses integrally connected with said head, a skirt separate from said head in the regions between said bosses and from one of said bosses but integrally connected with the other of said bosses, and means of less expansible material than said skirt connecting said skirt with the separated boss.

12. A piston, comprising, a head, wrist pin bosses integrally connected with said head, a skirt separated from said head in the regions between said bosses and from one of said bosses but integrally connected with the other of said bosses, and means of less expansible material than said skirt anchored in the separated boss and anchored to the adjacent parts of said skirt.

13. A piston, comprising, a head, wrist pin bosses integrally connected with said head, a skirt separated from said head in the regions between said bosses and separated from one but integrally connected with the other of said bosses, and means of less expansible material than said skirt anchored in the separated boss and anchored to the adjacent parts of said skirt at points circumferentially removed from its ends.

WILLIAM M. VENNER.
PERCY L. BOWSER, Jr.